United States Patent
Jusas et al.

(10) Patent No.: US 7,073,712 B2
(45) Date of Patent: Jul. 11, 2006

(54) RFID ENCODING/VERIFYING APPARATUS

(75) Inventors: Keith Jusas, Kings Park, NY (US); Brian Jusas, Wading River, NY (US); Todd Jusas, East Northport, NY (US)

(73) Assignee: Clintrak Clinical Labeling Services, LLC, Bohemia, NY (US)

( * ) Notice: Subject to any disclaimer, the term of this patent is extended or adjusted under 35 U.S.C. 154(b) by 140 days.

(21) Appl. No.: 10/635,418

(22) Filed: Aug. 6, 2003

(65) Prior Publication Data

US 2005/0029350 A1    Feb. 10, 2005

(51) Int. Cl.
  *G06K 7/08*    (2006.01)
(52) U.S. Cl. ............... 235/451; 235/375; 235/383; 340/572.1
(58) Field of Classification Search ......... 235/451, 235/375, 380, 382, 383, 385, 492; 340/572.1, 340/572.8; 156/300, 555
  See application file for complete search history.

(56) References Cited

U.S. PATENT DOCUMENTS

| | | | |
|---|---|---|---|
| 4,576,854 A * | 3/1986 | Kurahashi | 428/204 |
| 5,838,253 A * | 11/1998 | Wurz et al. | 340/10.42 |
| 5,973,600 A * | 10/1999 | Mosher, Jr. | 340/572.8 |
| 6,104,291 A * | 8/2000 | Beauvillier et al. | 340/572.1 |
| 6,140,146 A * | 10/2000 | Brady et al. | 438/62 |
| 6,246,326 B1 * | 6/2001 | Wiklof et al. | 340/572.1 |
| 6,294,998 B1 | 9/2001 | Adams et al. | |
| 6,369,711 B1 | 4/2002 | Adams et al. | |
| 6,429,831 B1 | 8/2002 | Babb | |
| 6,451,154 B1 | 9/2002 | Grabau et al. | |
| 6,458,234 B1 | 10/2002 | Lake et al. | |
| 6,478,229 B1 * | 11/2002 | Epstein | 235/492 |
| 6,557,758 B1 * | 5/2003 | Monico | 235/380 |
| 6,677,852 B1 * | 1/2004 | Landt | 340/10.1 |
| 2003/0063139 A1 * | 4/2003 | Hohberger et al. | 347/2 |
| 2003/0067381 A1 * | 4/2003 | Mitchell et al. | 340/5.92 |

* cited by examiner

*Primary Examiner*—Steven S. Paik

(57) ABSTRACT

An encoding/verifying apparatus and method for encoding/verifying RFID containing stock is provided. The encoding/verifying apparatus enables the verification of information already programmed on stock containing a RFID tag and/or encodes specific information to the RFID component of the stock while verifying that the proper stock is programmed with the correct information. Stock can either be on a roll or a fan fold with or without pin feeds. The stock will be read/encoded one at a time and advanced only after each successful read/write. Any stock that contains a failed RFID component will be marked so as to designate it as defective. In addition, methods for uniquely programming RFID containing stock are also provided.

44 Claims, 4 Drawing Sheets

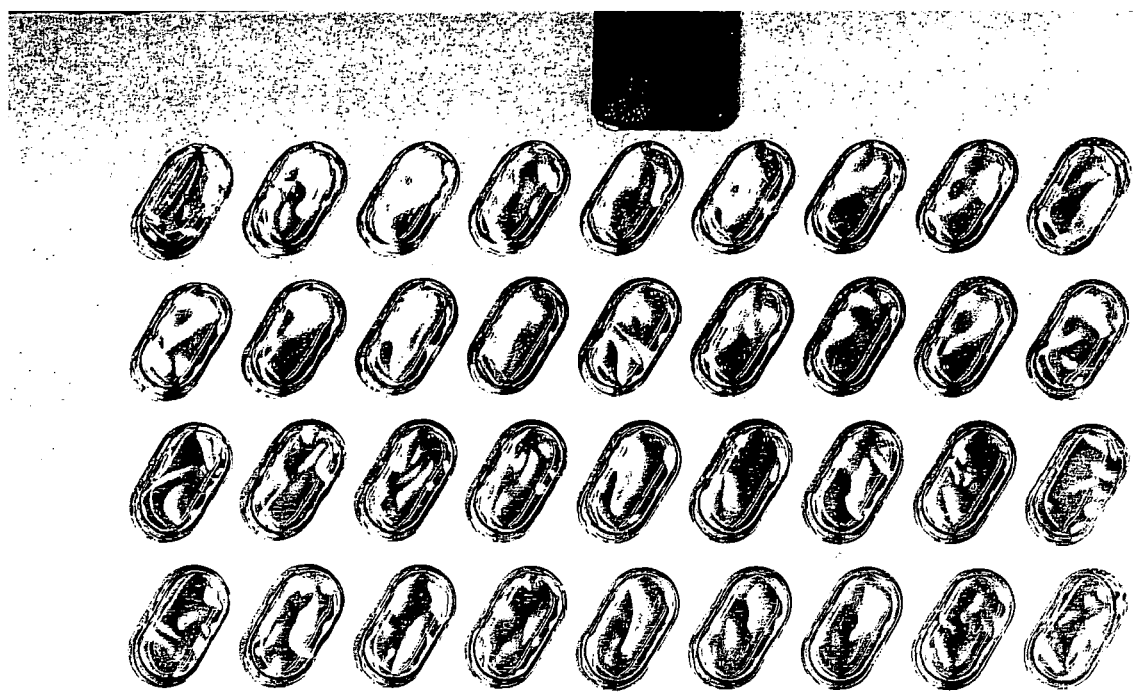
Figure 4
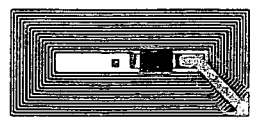

RFID ENCODING/VERIFYING APPARATUS

FIELD OF THE INVENTION

The present invention relates to encoding/verifying information on RFID tags, and/or labels, blister packs, boxes, bottles, or any other type of packing material containing radio frequency identification (RFID) technology, herein referred to collectively as "stock". The term "stock unit" used herein shall mean an individual RFID tag, and/or label, tag, blister pack, box, bottle, vial, syringe or other type of packing material containing radio frequency identification (RFID) technology.

BACKGROUND OF THE INVENTION

The identification industry has undergone many changes over the past few years especially with respect to the use of transponders to track and identify items. RFID systems are well known in the art and are used to encode tags with information for easy retrieval. A so-called smart label is a direct development from the RFID systems that incorporates an integrated circuit coupled with an antenna with read/write capability used to store data for identification and/or tracking. The resulting RFID system has been made small enough to fit into a standard adhesive label without appreciably affecting the thickness of the label.

As an out growth of the smart label industry many attempts have been made to produce printers/devices that were able to print indicia on the surface of the label and encode information to the tag embedded into the label. The printers available on the market today that have the capability to print indicia on the label and encode information on a tag do so either in a non-customized bulk mass method or are inefficient, limited and hard to use. The "mass-producing" printers available today having the capability to print and encode information on a tag were developed for speed and are not capable of producing label lots where each label in the lot has different information encoded on the tag. The thermal printers that are capable of producing smaller lots are very slow, use thermal print technology, and require the user to be highly skilled in programming to use them effectively.

In fields where the label on the package is as important as the material inside the package there is a need for a device that is easy to use that can produce customized RFID stock in such a way that each stock unit in a single lot can have very different information programmed to it and this information once programmed can be verified without extensive human intervention. Since it is well known in the art that increased human intervention in a given process introduces the high chance of mistakes to any process, a device that is able to write information to RFID containing stock and verify information on that RFID tag in stock lots where each individual stock unit has very different information than the other stock unit in the lot that requires only limited human intervention is needed.

One such field where this technology is needed is the Food & Drug Administration (FDA) regulated drug industry, in particular labels used on drugs in clinical trials. In this field there is one absolute when dealing with the FDA or any overseas regulatory authority and it's grounded in common sense: every drug must be correctly labeled and when possible, permanently affixed to the container. Obeying this simple rule doesn't appear at first to be much of a burden. However, add to this equation the following: more and more FDA mandated information must appear on the label, the growth of multi-drug trials, and multi-lingual trials, and it can easily be seen that a device that is capable of mass producing drug labels but is not capable of writing unique information to each RFID tag containing labels is not helpful in this field, especially when some trials only contain as little as 25 containers. Therefore, there is a need for an encoding/verifying device that is able to effectively work with stock containing RFID tags where each stock unit in a given lot may contain different/unique information from the previous stock unit with as little human intervention as possible.

The apparatus of the present invention overcomes the shortcomings of the printers/devices available today and reduces the chance of labeling errors/omissions and thus reduces the chance of clinical drug trial nullification and/or drug recalls due to mislabeling.

SUMMARY OF THE INVENTION

The invention is directed to an encoding/verifying apparatus for RFID containing stock and methods for encoding/verifying RFID stock using the apparatus of the invention. The RFID stock encoding/verifying apparatus enables the verification of information already programmed on stock and/or writes specific information to the RFID component of stock while verifying that the proper stock unit is programmed with the correct information.

One embodiment of the apparatus for encoding/verifying RFID stock includes a platform for positioning stock upon and a feeder positioned on the platform for advancing the stock in a specified direction. The apparatus also includes a motor that is either directly wired to the feeder or indirectly communicates with the feeder so as to advance the stock a predetermined distance when activated. A RFID read/write unit comprising at least one antenna with read/write capability for transmitting information to the RFID component of the RFID containing stock is positioned in the apparatus so as to be able to verify existing information on the stock or write information to the stock once the RFID component of an individual stock unit is within the radio frequency field of the RFID read/write unit.

The apparatus may also include a processor positioned so as to be able to communicate with the motor and the RFID read/write unit. The processor is responsible for controlling the motor connected to the feeder as well as the transmission of data to and from the RFID read/write unit. In another embodiment, the apparatus further comprises a radio frequency driver positioned in the apparatus so as to be in communication with the processor. The radio frequency driver is configured so as to send signals to the RFID read/write unit for transmission to the RFID component of the stock. The processor may also be equipped with volatile memory for storing data to be sent to said radio frequency driver as well as non-volatile memory for storing program instructions for controlling said processor.

The program instructions may comprise the following steps: (1) reading the data from the file/database stored in the memory; (2) generating a writing signal for the radio frequency driver; and (3) sending of a signal from the processor commanding the operation of the radio frequency driver to encode at least one RFID containing stock unit in response to reading the data.

In one embodiment of the invention the apparatus is equipped with either a barcode reader or an OCR scanner. The barcode reader is positioned so as to be able to read information from the RFID containing stock units as they are advanced passed the barcode reader. The OCR scanner may be used in place or in addition to the barcode reader and shall be used in the same fashion.

The barcode reader/OCR scanner may be in communication with the processor so that information scanned by the barcode reader/scanner can be either encoded directly to the RFID component of a stock unit or matched with additional information stored in the processor. The matched information can be encoded to the RFID component of a stock unit by the RFID read/writer unit. The barcode/OCR scanner information may also be used to verify information already encoded on the RFID component of a stock unit the RFID read/writer unit.

In one embodiment, the processor may be connected to a marking unit that is capable of marking stock as defective when activated.

In one embodiment of the invention, if the barcode reader/OCR information and the information encoded on the RFID component of the stock unit are not as intended, the marker will be activated to mark the stock unit as defective. The marker can mark the stock unit either with the word "VOID" or some other descriptive mark indicating to the user that the stock unit is defective. In the alternative, a perforation can be made on the stock unit to assure that it is not used.

The invention is also directed to a method of encoding stock using the apparatus described above. The method of the invention can be used to verify/encode information on a stock unit. For example, the verifier can be used to read the serial number on the RFID component of a stock unit and store the serial number to a database for later use. Once the information is verified the writer of the apparatus can be used to place additional information on the RFID component of the stock unit. Once completed the motor attached to the feeder advances the stock unit and the process begins all over again.

BRIEF DESCRIPTION OF THE DRAWINGS

FIG. 4 is a front view of a RFID containing blister pack.

DESCRIPTION OF THE DRAWINGS

Figure 1:
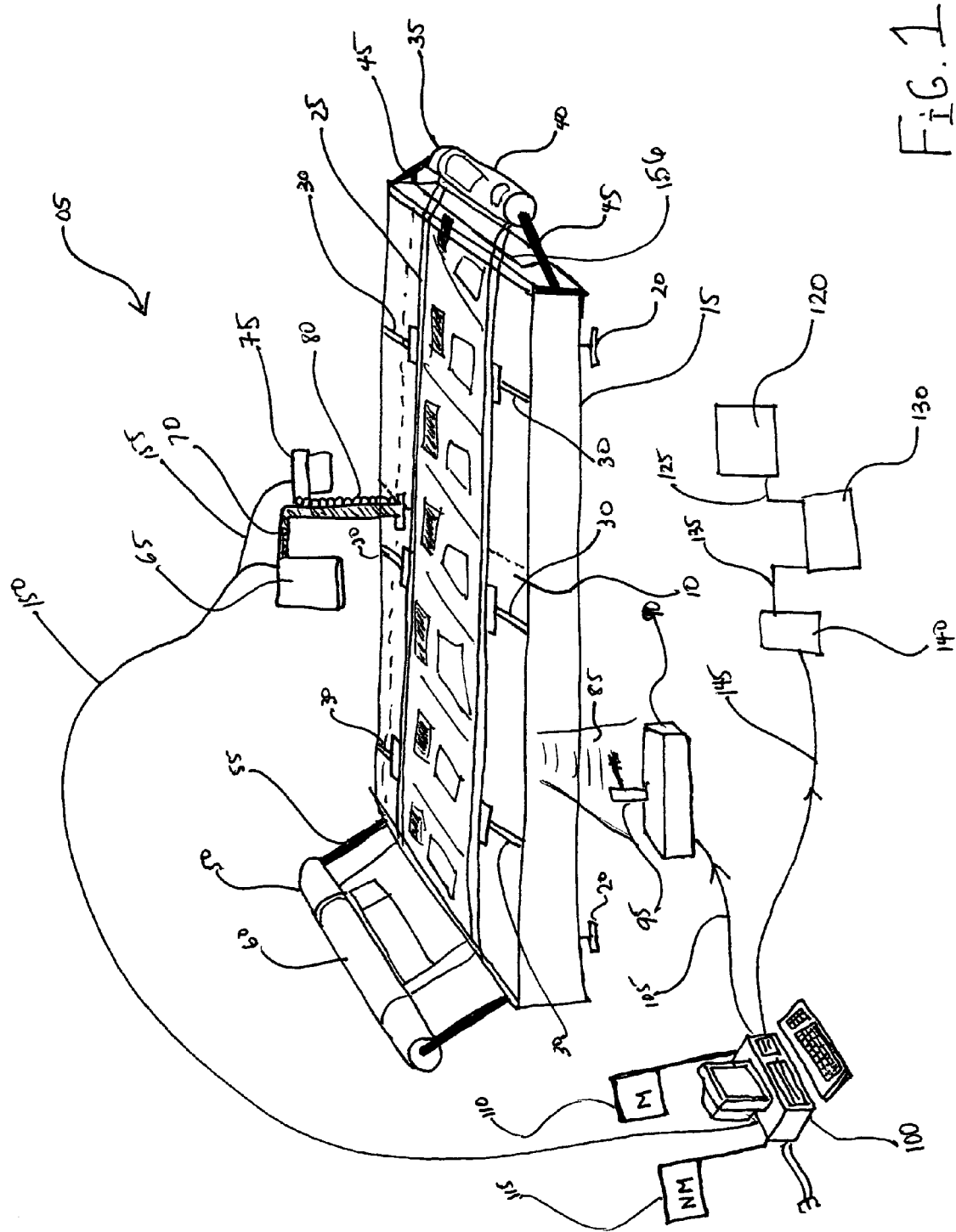
FIG. 1 is a side view of a RFID stock encoding/verifying apparatus of the present invention.

(05) RFID stock Encoding/Verifying Apparatus
(10) Platform of the Apparatus
(15) Body of the Apparatus
(20) Levels
(25) Stock Guides
(30) Adjustable Tracks For Stock Guides
(35) Forward Stock Roller
(40) Unverified Stock
(45) Adjustable Forward Stock Roller Arms
(50) Receiving Stock Roller
(55) Adjustable Receiving Stock Roller Arms
(60) Post Verified Stock
(65) Barcode Reader
(70) Adjustable Arm
(75) Motorized Marking Unit
(80) Adjustable Height Level wind
(85) RFID signal
(90) RFID Reader/Writer
(95) RFID Antenna
(100) Computer Processor
(105) Connection between RFID reader/Writer and Processor
(110) Memory
(115) Non-volatile Memory
(120) Motor
(125) Connection Between Motor and Motor Driver
(130) Motor Driver
(135) Connection Between Motor Driver and Controller
(140) Controller
(145) Connection Between Controller and Processor
(150) Connection Between Barcode Scanner and Processor
(155) Connection Between Motorized Marker and Processor
(156) Anti-Static Component at feeding end of apparatus

DETAIL DESCRIPTION OF THE INVENTION

The present invention is directed to a RFID stock encoding/verifying apparatus and a method of encoding/verifying information on stock using the aforementioned apparatus.

RFID systems are well known in the art, and the basic RFID system consists of an antenna, a transceiver, and a transponder (RFID tag). The RFID tag is encoded with information for easy retrieval. The antenna emits radio signals to activate the RFID tag so that the tag can be read/written to, and acts as a conduit between the tag and the transceiver. When the antenna is packaged with the transceiver, an interrogator is created.

The interrogator is used to read/write the information from/to the RFID tag when necessary. The interrogator emits radio waves in various ranges, depending upon the power output of the interrogator as well as the range of the RFID tag. When an RFID tag passes through the electromagnetic zone, it detects the interrogator's activation signal through an antenna in the RFID tag. The antenna senses the interrogating field and acts as the method of transmitting a response to the interrogator. The interrogator receives and decodes the data encoded in the RFID tag's integrated circuit and the data is passed to a host computer for processing. Once the data from the RFID tag is passed to the host computer and it is verified the host computer can either send a signal to the motor to advance to the next stock unit or to the interrogator to write additional information to the tag.

A so-called smart label is a development from RFID systems that incorporates an integrated circuit coupled to an antenna with read/write capability used to store data for identification and tracking of articles. The resulting RFID tag is small enough to be placed into a standard adhesive label without appreciably affecting the thickness of the label. Thus, the smart label can be used in many applications such as express parcel delivery, airline baggage handling, clinical drug supplies such as blister packs, vials, syringes, or any other packing material. The smart label offers advantages over standard labels by providing the ability to rewrite data to the RFID label, read/write the RFID label without line-of-sight restriction, read the RFID label from a greater distance, and read/write multiple RFID labels at one time.

Conventional prior art label printers are capable of printing labels in a fast, efficient way. Since the RFID tags are small enough so as not to change the thickness of the adhesive labels, these printers are also efficient in printing indicia on labels containing RFID tags. However, although there have been attempts to combine printing with programming RFID tags the results have not been satisfactory. In other words, a RFID stock encoding/verifying apparatus that is efficient and capable of programming different/unique information on each RFID label in the same run is needed.

The flexibility of an apparatus to program specific data to specific RFID containing stock units having specific print is especially important when only one stock unit in a given printing process has the same information programmed on it. As stated above, this is especially important in the clinical trial drug label field where sometimes as little as one label out of a run of thousands has patient specific information for a specific clinical drug trial. Since accuracy is expected in clinical drug trials it is imperative that the printed information on the label have the correct information programmed on the RFID portion of the label. If not, a complete clinical trial can be in jeopardy, and hundreds of thousands of dollars lost.

Using RFID containing stock, the present invention can verify existing information on a RFID containing stock unit and/or write specific information to the RFID component of the stock unit that corresponds to that particular stock unit. The invention set forth below and in the claims is such an apparatus.

The present invention satisfies the need for an apparatus that can verify information on a RFID containing stock unit and write additional information when necessary. The additional information to be written to the stock unit can be stored in a processor, on a disk, CD, network server or a central processing unit (CPU). Each package of information may be assigned a particular identification number or optical character.

The apparatus may also be equipped with an optical reader/barcode scanner. Various optical readers and scanning systems have been developed for reading barcode symbols appearing on a label or the surface of an article. Any one of which can be used with the invention. The barcode symbol itself can be a coded pattern of indicia comprising a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters intended to be descriptive of the article or some characteristic of it.

The readers and scanning systems use a light source in a laser to convert the graphic indicia into electrical signals. The light source in a laser scanner is typically a gas or semiconductor laser. Use of semiconductor devices as the light source in scanning systems is particularly desirable because of its small size; low cost and low power requirements. The laser beam is optically modified, typically by a lens, to form a beam spot of a certain size at the target distance.

The scanning systems also include a sensor or photo detector, which functions to detect light reflected from the symbol. The photo detector is therefore positioned in the scanner or in an optical path in which it has a field of view, which extends across and slightly past the symbol. A portion of the reflected light which is reflected off the symbol is detected and converted into an electrical signal. Electronic circuitry or software thereafter decodes the electrical signal into a digital representation of the data represented by the symbol that has been scanned. For example, the analog electrical signal from the photo detector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

In one embodiment of the invention an omni-directional barcode reader is used. This type of barcode scanner uses a scanner for reading indicia having portions of differing light reflectivity which has a means for directing a light beam from the scanner towards the indicia and collecting reflected light returning from the indicia. The scanner includes a scanning arrangement with a scanner component, such as a mirror. First and second vibratory means support the scanner component for angular oscillatory movement to scan the light beam in first and second orthogonal scan directions. The scanning arrangement includes read-start means for moving the scanner component to simultaneously scan the light beam in the first and second scan directions. Control means, operatively connected to the read-start means, are provided for imparting differing signals to the read-start means to (1) alternatively drive fast and slow vibrations of the first and second vibratory means to vary the scanning of the light beam in the first scan direction and (2) to drive vibration of only the second vibratory means to cause the scanning of the light beam in the second scan direction. The scanning of the light beam in the first and second scan directions generates a scan pattern over the indicia.

Still another embodiment of the invention uses a barcode reader which incorporates an imaging sensor, such as a charge coupled device (CCD) or other solid state imaging device. CCDs consist of an array of many detectors, commonly referred to as "pixels." The entire symbol is flooded with light from the reader or ambient light, and each pixel is sequentially read out to determine the presence of a bar or a space. Such readers are lightweight and easy to use, but require substantially direct contact or placement of the reader on the symbol to enable the symbol to be properly read. Such a physical contact of the reader with the symbol is preferred mode of operation for applications that are relatively stationary and not hand held, or as a matter of personal preference by the user.

The barcode reader may be retractably integrated on to the platform of the RFID stock encoding/verifying apparatus so that it can be placed at various positions. For example, the reader may be placed near the perimeter of the platform when wide stock is used and repositioned towards the interior of the platform when a narrow stock is being used. A magnetic stand may be used to hold the barcode reader/OCR scanner that can be moved by activating and deactivating the electronic magnetic.

In an alternative embodiment, the RFID encoding/verifying apparatus comprises multiple barcode readers arranged in different orientations. When the apparatus is equipped with multiple barcode readers it is capable of reading barcodes in various orientations without stopping the run to adjust the apparatus. Having multiple barcode readers also enables the apparatus to be used with stock containing more than one barcode. Another added benefit of having multiple barcode readers in the apparatus is the reduction in the amount of time required to reset the apparatus when the apparatus is loaded with stock that contain barcodes in a different orientation than the previous run.

Still another embodiment of the invention comprises a platform that contains a transparent window wherein the barcode reader/OCR scanner is positioned. All other functions of the barcode reader/OCR scanner remain the same as if it was positioned on the platform as described above. Once a barcode is read and decoded by a suitable barcode reader, a computer may use the decoded data to access associated data that has been stored in a database associated with the stock unit. The accessed database data that is linked to the decoded barcode can be written to the RFID component of the stock unit accordingly.

In one embodiment of the invention an optical character recognition (OCR) device may be used in addition to the barcode reader or in place of the barcode reader. In the embodiment where an OCR is used in addition to the barcode scanner, the barcode symbol including barcode characters corresponding to the human readable characters is attempted to be decoded. If a barcode character is not successfully decoded, the OCR identifies distinctive human readable characters in the image that is then corresponded to either a barcode in the database or a specific text character. Either way, the stock is then linked to the specific data associated with it that is stored in the database.

In another embodiment of the invention, a system for reading data from stock that includes a barcode symbol and human readable characters is provided. The system includes an imaging system with a camera for capturing an image of the stock. The captured image includes both the barcode symbol and the human readable characters. The system also includes a stock decoding system for processing the image. The stock decoding system locates the barcode symbol in the image and attempts to decode each character in the barcode symbol. If one of the barcode characters fails to be decoded, the stock decoding system locates the human readable characters in the image and maps the failed barcode character to at least one of the human readable characters. These human readable characters are converted into text characters, which are converted into a substitute barcode character that is used to decode the barcode symbol and find the associated data in the database.

When the stock is advanced past either the barcode scanner or the OCR scanner the barcode or OCR information is sent to the processor. Once the OCR or barcode information is sent to the processor, the processor can send a signal to a RFID reader/writer to read the information already on the RFID tag component of the stock unit and send the information to the processor for verification. Once verified, the processor can instruct the RFID reader/writer to write any additional information associated with the OCR character or barcode in the processor or advance the motor so that the next stock unit is moved into position. If the barcode or OCR is either not recognized by the processor or the data written on the RFID tag component of the stock unit is incorrect the RFID containing stock unit will be marked as defective.

In fields where each stock unit may have unique information associated with it, such as stock used on clinical drug supplies including labels used on vials, syringes, blister packs, testing bottles, and/or any other clinical drug delivery packaging, the apparatus of the present invention provides a mechanism that is able to read, verify, write and re-verify information to the RFID component of a stock unit in a controlled process that does not rely predominately on human intervention. Limiting the need for human involvement limits the chance for human error. The apparatus of the invention is configured to encode/verify information on RFID containing stock, one stock unit at a time, which allows for precision rather than pure speed.

By way of background information a basic RFID system consists of an antenna, a transceiver, and a transponder (RFID tag). The RFID tag is encoded with information for easy retrieval. The antenna emits radio signals to activate the RFID tag so that the tag can be read, and acts as a conduit between the tag and the transceiver. When the antenna is packaged with the transceiver, an interrogator is created. The interrogator is used to read the information from the RFID tag when necessary. The interrogator emits radio waves in various ranges, depending upon the power output of the interrogator as well as the range of the RFID tag. When a RFID tag passes through the electromagnetic zone, it detects the interrogator's activation signal through an antenna in the RFID tag. The antenna senses the interrogating field and acts as a method of transmitting a response to the interrogator. The interrogator receives and decodes the data encoded in the RFID tag's integrated circuit and the data is passed to a host computer for processing.

In the event that either the RFID tag is defective or contains information that does not belong on a label or on the RFID tag having that barcode and/or character then the processor initiates a process to mark the label as defective or stops the process and waits for technician intervention. For example the label can be marked as "VOID" to indicate that it is improper and that information is recorded to the processor.

In one embodiment of the invention a solenoid operated "VOID" stamp is used. A rod of the solenoid operates through linkages to rotate an arm of the stamp in the direction of an inkpad. The stamp will engage the inkpad and then oscillate to stamp impressions, e.g. VOID, upon the stock unit. The solenoid is actuated at any time that the processor controls determine that either the barcode or information encoded on the stock unit deviates from standard or acceptable tolerances, so as to reject the stock unit. It is denominated as "void" stamp because it is contemplated that the word "void" will be formed on the inkpad for stamp printing. Any other symbol, of course, could be formed on the pad to imprint whatever indicia might be desired.

In one embodiment of the invention, the platform of the apparatus is fitted with a conveyor belt that is advanced by the motor of the apparatus. The conveyor belt is capable of positioning items containing RFID tags into position so that these items, which cannot be pin fed or pressure fed can be used in the apparatus. This embodiment contains all of the features and attributes described in the embodiments above.

The apparatus of the present invention is described in FIGS. 1–4 and is further detailed below.

Referring to FIG. 1 of the invention, the RFID encoding/verifying apparatus (05) is shown. The device of the present invention comprises a platform (10) having a body (15) with a flat surface for sliding stock upon from one end of the platform to the other. The platform can be either a solid surface or have an adjustable transparent portion that can widen and close in small increments so as to accommodate stocks of different sizes. The body (15) has two sets of opposing ends wherein one set is smaller in length than the other set producing a rectangular shape. Other shaped platforms are also within the scope of the invention. The body may be fitted with levels (20) that assist in leveling the machine on most surfaces.

Attached to one end of the body (15) are left and right adjustable forward stock roller arms (45). These arms are connected to a track so that the distance between the two arms can be adjusted to accommodate various sized stock. Attached to the adjustable forward stock roller arms (45) is a forward stock roller (35) designed to hold stock (40) that have not yet been encoded or verified by the apparatus of the invention.

The stock on the forward stock roller (35) is fed through a station bar (not shown) designed to keep the stock from rising off of the surface of the platform (10) as it is slide across the platform (10). Attached to the opposite end of the platform (10) is a receiving stock roller (50) designed to accept the stock from the forward stock roller (35) after it travels across the platform surface and is acted upon. The receiving stock roller (50) is attached to right and left adjustable receiving stock roller arms (55) that are connected to a track so that the distance between the two arms can be adjusted to accommodate the size of the stock released from the forward stock roller (35).

Prior to the encoded/verified stock (60) being disposed onto the receiving stock roller (50) they are fed through a station bar (not shown) designed to keep the stock from rising off of the surface of the platform (10) as it is slide across the platform (10) on to the receiving stock roller (50). This can be the same type of station bar located at the opposite end. Both station bars may be adjustable in height and/or removable. In addition, the apparatus is fitted with an anti-static component (156) at the feeding end of the apparatus. As the name of this component indicates, this anti-static bar reduces static on the stock prior to being acted upon by the reader/writer. Static can interfere with reading/writing of the RFID component of the stock units. Therefore, by reducing static at the beginning of the process any potential problems with static can be avoided further down in the process.

As stock is fed from the forward stock roller (35) to the receiving stock roller (50) across the platform (10) it is aligned by stock guides (25) located on each side of the stock. The stock guides (25) are directly attached to the adjustable track for stock guides (30). These tracks are adjustable so as to accommodate different stock widths used in the apparatus. Several different types of stock guides (25) can be used, all of which fall within the scope of the invention. For example, one embodiment of the invention uses stock guides (25) that are attached to the platform (10) via adjustable stock tracks (30) at one end and are flanged upward and extend parallel to the platform so that the stock can slide beneath the track. With the stock beneath the stock guides the upward motion of the stock is limited and the stock is less likely to move from side to side. In other words, the track assures that the stock follow a given path without popping above the flange.

In another embodiment of the invention, the stock guides (25) are attached to adjustable track for stock guides (30) and comprise a wheel fitted with pin feeds thereon that are designed to interlock with the pin feed holes on the outer border of the stock. This assures proper alignment of the stock. The wheel having pin feeds can be motorized to assist in moving the stock across the platform or be non-motorized with movement of the stock being done by other motors in the system.

In the alternative, the forward roller and the receiving roller can be replaced with a tray so that other stock can be used instead of roll stock. Both embodiments are within the scope of the present invention.

A barcode scanner (65) is attached to an adjustable arm (70) that is attached to platform (10). The adjustable arm (70) can be attached to a track (not shown) that allows the barcode scanner to move about the platform (10) so as to accommodate different stock sizes and barcode locations. In one embodiment of the invention, the adjustable arm (70) attached to the barcode scanner (65) is magnetized and does not require any tracks. Other adjustable vehicles are also possible and are within the scope of the present invention.

The barcode scanner (65) is in communication with the computer processor (100) via cable (150). In an alternative embodiment of the invention a wireless barcode scanner can be used eliminating the need for cable (150). Either way the connection between the processor and the barcode scanner allows the information obtained by the barcode scanner to be processed and associated with any additional data corresponding to that particular barcode that might be stored in memory (110) of the processor (100).

The RFID encoding/verifying apparatus is equipped with a RFID reader/writer (90). The reader/writer (90) is in communication with computer processor (100) via cable (105). In the alternative, the connection can be wireless. The reader/writer (90) comprises at least one antenna that emits radio signals to activate the RFID component of the stock so that it can be read/encoded, and acts as a conduit between the RFID component and a transceiver in the reader/writer (90). The antenna (90) together with the transceiver makes up an interrogator. The interrogator is used to read and/or encode information from and/or to the RFID component of the stock unit when necessary.

The interrogator emits radio waves in various ranges, depending upon the power output of the interrogator as well as the range of the RFID tag. When an RFID tag containing stock unit passes through the electromagnetic zone, it detects the interrogator's activation signal through an antenna in the RFID tag. The antenna senses the interrogating field and acts as the method of transmitting a response to the reader/writer (90). The reader/writer (90) receives information via antenna (95) and decodes the data encoded in the RFID tag's integrated circuit. The data is then passed to computer processor (100) for processing. The information already existing on the RFID tag component of the stock unit is read by the reader/writer (90) and then verified by the processor (100).

Any additional information that is stored in the processor's memory (110) that corresponds to the barcode can be sent to the reader/writer (90) so that the writer portion of the reader/writer (90) can write the additional information on to the RFID component of the stock unit having that particular barcode. New information can also be included that can supercede the existing information on the RFID component of the stock unit.

The processor is also equipped with a non-volatile memory (115) that contains the processing logic to decode the data from the RFID component of a stock unit, control the reader/writer (90), control the driver/motor (described below) that advances the stock, operate the barcode reader and/or OCR scanner, and operate any other mechanical/functional part that is necessary to run the apparatus.

As stated above the processor operates the several functional components of the apparatus including the motor driver (130), motor (120) and controller (140). The controller (140) is in communication with the processor (100) via cable (145). The controller (140) is in communication with the motor driver (130) via cable (135). The motor (120) is then in communication with the motor driver (130) via cable (125). All of these components work together to advance the motor so that the stock can be advanced to the next position. For example, if data verification and/or new data encoding is complete the processor sends a digital signal to the controller (140) that in turn sends a signal to the motor driver (130) which converts the digital signal from the controller to a pulse signal. The pulse signal is then passed to the motor which activates the motor (120) to advance the stock a given distance. The process is repeated until all of the stock is through the machine or otherwise turned off.

In one embodiment of the invention, the processor (100) is in communication with an optical sensor designed to detect changes in the thickness of the stock or to detect the presence of toner or ticks marks next to each new stock unit. In other words, the optical sensor is able to detect a density (or thickness) the difference between a stock unit plus it's liner material and just liner material, or the presence of a toner or tick mark next to a new stock unit. When either a density change or mark is detected by the optical sensor a signal is sent to the processor (100) which in turn sends a digital signal to the controller (140) that in turn sends a signal to the motor driver (130) which converts the digital signal from the controller to a pulse signal. The pulse signal is then passed to the motor (120) that activates the motor (120) to advance the stock a predetermined distance. This process is repeated until all of the stock is through the machine or the machine is otherwise turned off.

In another embodiment of the invention, the optical sensor is connected either directly to the motor (120) or to the motor driver (130). When either a density change or mark is detected by the optical sensor a signal is sent to either the motor driver (130) or to the motor (120) directly in order to advance the stock so that the RFID tag of the next stock unit is in position to be read or written to. The optical sensor can also be used with a continuous motor. In this embodiment, either a density change or mark will cause the optical sensor to send a signal to the processor (100) which in turn activates the RFID read/write unit of the apparatus to read and/or written to the RFID tag of the stock unit.

The controller (140) aids in activating the driver motor (130) and RFID reader/writer in unison with the ability to integrate with a barcode scanner and/or OCR scanner to complete the method protocol of the apparatus. The RFID containing stock is verified/encoded one stock unit at a time, advancing only after each successful read/write. Data will be encoded directly to the RFID component of a stock unit. The controller will also ensure that defective stock units are not produced by not advancing the driver motor (140). For example, any stock unit that contains a failed RFID/tag will be imprinted with the word "VOID" by marker (75) (described above) and only after this is completed will the controller (140) send the signal to the driver motor (130) to advance the motor (120). The processor can also signal to the motor (120) to stop the process until a technician intervenes.

Positioned in the case of the apparatus is the proper power source/receptacle as well as proper ventilation. In some designs one or more fans can be used to cool the electrical components within the case. It is understood that the cooling and or powering of such mechanical systems are well know in the art and will be used in the apparatus of the present invention.

Once either the barcode reader and/or the RFID reader/writer senses the last stock unit has been completed and audible signal is released from a siren attached to the machine (not shown). In one embodiment a message is sent to a beeper once the process is completed or some abnormality is sensed by the system. This would allow workers to move freely about and attend to other jobs while this apparatus is in operation. In still another embodiment the processor can be attached to a network so that it may be controlled from a central station and any data collected can be stored in the main frame. Although these additions are not shown they are anticipated as part of the present invention.

Figure 2:
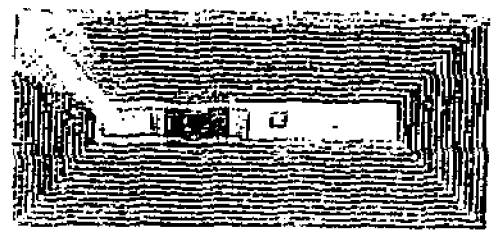
FIG. 2 is a front view of a RFID tag.
Figure 3:
FIG. 3 is a front and back view of a RFID containing label.
Figure 3:

FIG. 2 shows a RFID tag. FIG. 3 shows a label containing a RFID tag. FIG. 4 shows a blister pack containing a RFID tag.

The present invention also includes a method of verifying and writing to a RFID containing stock. A method for encoding/verifying information onto the RFID component of a stock unit using the apparatus described above comprises positioning RFID containing stock on platform (10) so that the stock comes in contact with a feeder. Once in position the stock is advanced to place at least one stock unit in communication with the RFID read/write unit (90). The information on the RFID component of the stock is read by the RFID reader (90) and communicated to the computer processor (100) and the barcode/OCR information is also read and communicated to the computer processor (100). The computer processor generates at least one program instruction from the group consisting of instructing said read/write unit to write specific information to the stock unit, activating the motorized marking unit (75) to mark the stock unit, and advancing the motor (120) connected to the feeder to advance the stock unit to position the next stock unit in line of site of the barcode reader/OCR scanner (65), and repeat the process.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

What is claimed is:

1. An RFID encoding/verifying apparatus comprising:
   a platform for positioning RFID containing stock including barcodes upon;
   a feeder positioned on said platform for advancing said RFID containing stock:
   a motor in communication with said feeder for advancing said RFID containing stock a predetermined distance when activated;
   an RFID read/write unit comprising at least one antenna with read/write capability for transmitting information to said RFID containing stock as said RFID containing stock is advanced past said RFID read/write unit;
   at least one antenna with read/write capability for transmitting information to RFID containing stock as said RFID containing stock is advanced past said at least one antenna;
   at least one barcode reader positioned on said platform so as to read information from said RFID containing stock as said RFID containing stock is advanced passed said barcode reader and wherein the at least one barcode reader is in communication with a processor and said barcode reader reads said barcodes on said RFID containing stock and sends information to said processor to be verified;
   said processor in communication with said motor and said RFID read/write unit, said processor controlling the advancing of said motor and the transmission of data to and from said RFID read/write unit;
   a radio frequency driver in communication with said processor, said radio frequency driver configured so as to send signals to said RFID read/write unit for transmission to said RFID containing stock; and
   a marking unit in communication with said processor wherein said marking unit perforates designs in said RFID containing stock when activated.

2. The RFID encoding/verifying apparatus according to claim 1 wherein the feeder is either tractor fed or non-tractor fed.

3. The RFID encoding/verifying apparatus according to claim 2 wherein the feeder is attached to an adjustable track and said feeder can be adjusted to accommodate REID containing stock of various widths.

4. The RFID encoding/verifying apparatus according to claim 1 wherein at least part of the platform is transparent and said barcode reader is positioned directly below said transparent portion of said platform.

5. The RFID encoding/verifying apparatus according to claim 4 further comprising two retractable shutters positioned on opposite sides of the transparent portion of the platform enabling the widening and narrowing of the transparent portion of the platform.

6. The RFID encoding/verifying apparatus according to claim 4 further comprising a cycling belt positioned around said platform and in communication with said motor for moving said RFID containing stock in a predetermined direction.

7. The RFID encoding/verifying apparatus according to claim 1 further comprising an optical sensor in communication with said motor, said optical sensor controlling the advancing of said motor according to data gathered by said optical sensor.

8. The RFID encoding/verifying apparatus according to claim 1 further comprising an optical sensor in communication with said processor, said processor sending RFID commands to read and/or write data from/to a tag embedded in a stock unit once a signal is sent from said optical sensor to said processor.

9. The RFID encoding/verifying apparatus according to claim 1 wherein at least part of the platform is transparent and said OCR scanner is positioned directly below said transparent portion of said platform.

10. The RFID encoding/verifying apparatus according to claim 1 wherein said barcode reader is attached to said platform by an adjustable arm that can accommodate RFID containing stock of various widths.

11. The RFID encoding/verifying apparatus according to claim 1 wherein said OCR scanner is attached to said platform by an adjustable arm that can accommodate RFID containing stock of various widths.

12. The RFID encoding/verifying apparatus according to claim 1 wherein said barcode reader is for reading barcodes of various widths.

13. The RFID encoding/verifying apparatus according to claim 1 wherein the motor is a stepper motor.

14. The RFID encoding/verifying apparatus according to claim 13 further comprising a stepper motor driver in communication with said processor whereby said controller converts a digital signal received from said controller to a pulse signal and relays said pulse signal to said stepper motor driver so as to drive said stepper motor accordingly.

15. The RFID encoding/verifying apparatus according to claim 1 further comprising an adjustable forward RFID containing stock roller for roll or non-printed fan-folded stock positioned at one end of said platform.

16. The RFID encoding/verifying apparatus according to claim 15 wherein said forward RFID containing stock roller is self adjusting whereby said forward RFID containing stock roller automatically adjusts its width so as to accommodate said width of said RFID containing stock.

17. The RFID encoding/verifying apparatus according to claim 16 further comprising a receiving roller for roll RFID containing stock positioned at the end directly opposite said forward RFID containing stock roller.

18. The RFID encoding/verifying apparatus according to claim 1 comprising an attachment located at opposite ends of said platform for feeding and receiving fan-fold RFID containing stock.

19. A method for encoding/verifying RFID containing stock using the RFID containing stock encoding/verifying apparatus according to claim 1 comprising;

positioning said RFID containing stock in said feeder on said platform of said RFID encoding/verifying apparatus;

advancing said RFID containing stock using said motor to position at least one RFID containing stock unit in communication with said RFID read/write unit;

reading said information on said RFID containing stock using said read/write RFID unit and communicating said data to said processor;

scanning said barcode and communicating said information to said processor;

generating at least one program instruction by said processor in response to comparing said RFID tag information and said barcode information by said processor;

said program instructions selected from the group consisting of instructing said read/write unit to write specific information to said RFID containing stock, activating said marking unit to mark said RFID containing stock, and advancing said motor so as to repeat said process.

20. The method according to claim 19 wherein an OCR is used in place of said barcode scanner.

21. The method according to claim 19 wherein clinical labels are produced.

22. The method according to claim 19 wherein non-clinical labels are produced.

23. The method according to claim 19 wherein blank RFID containing stock is used.

24. The RFID encoding/verifying apparatus according to claim 1 wherein one barcode reader is in a different orientation than a second barcode reader.

25. An RFID encoding/verifying apparatus comprising:

a platform for positioning RFID containing stock upon;

a feeder positioned on said platform for advancing said RFID containing stock;

a motor in communication with said feeder for advancing said RFID containing stock a predetermined distance when activated;

an RFID read/write unit comprising at least one antenna with read/write capability for transmitting information to said RFID containing stock as said RFID containing stock is advanced past said RFID read/write unit;

a processor in communication with said motor and said RFID read/write unit, said processor controlling the advancing of said motor and the transmission of data to and from said RFID read/write unit;

a marking unit in communication with said processor whereby said marking unit perforates said RFID containing stock when activated; and said feeder attached to an adjustable track wherein said feeder can be adjusted to accommodate RFID containing stock of various widths.

26. The RFID encoding/verifying apparatus according to claim 25 wherein the feeder is either tractor fed or non-tractor fed.

27. The RFID encoding/verifying apparatus according to claim 26 wherein the feeder is attached to an adjustable track and said feeder can be adjusted to accommodate RFID containing stock of various widths.

28. The RFID encoding/verifying apparatus according to claim 26 further comprising an adjustable forward RFID containing stock roller for roll or non-printed fan-folded stock positioned at one end of said platform.

29. The RFID encoding/verifying apparatus according to claim 28 wherein said forward RFID containing stock roller is self adjusting whereby said forward RFID containing stock roller automatically adjusts its width so as to accommodate said width of said RFID containing stock.

30. The RFID encoding/verifying apparatus according to claim 29 further comprising a receiving roller for roll RFID containing stock positioned at the end directly opposite said forward RFID containing stock roller.

31. The RFID encoding/verifying apparatus according to claim 26 comprising an attachment located at opposite ends of said platform for feeding and receiving fan-fold RFID containing stock.

32. The RFID encoding/verifying apparatus according to claim 25 wherein the read/write unit comprises at least one integrated circuit coupled to at least one antenna with read/write capability for transmitting information to RFID containing stock as said REID containing stock is advanced past said at least one antenna; and said RFID encoding/verifying apparatus further comprises at least one barcode reader positioned on said platform so as to read information from said RFID containing stock as said RFID containing stock is advanced passed said barcode reader.

33. The RFID encoding/verifying apparatus according to claim 32 wherein said barcode reader is positioned directly below said transparent portion of said platform.

34. The RFID encoding/verifying apparatus according to claim 33 further comprising two retractable shutters positioned on opposite sides of the transparent portion of the platform enabling the widening and narrowing of the transparent portion of the platform.

35. The RFID encoding/verifying apparatus according to claim 33 further comprising a cycling belt positioned around said platform and in communication with said motor for moving said RFID containing stock in a predetermined direction.

36. The RFID encoding/verifying apparatus according to claim 32 wherein one barcode reader is in a different orientation than a second barcode reader.

37. The RFID encoding/verifying apparatus according to claim 25 wherein the read/write unit comprises at least one integrated circuit coupled to at least one antenna with read/write capability for transmitting information to RFID containing stock as said RFID containing stock is advanced past said at least one antenna; and said RFID encoding/verifying apparatus further comprising an OCR scanner positioned on said platform so as to read information from said RFID containing stock as said RFID containing stock is advanced passed said OCR scanner.

38. The RFID encoding/verifying apparatus according to claim 37 wherein at least part of the platform is transparent and said OCR scanner is positioned directly below said transparent portion of said platform.

39. The RFID encoding/verifying apparatus according to claim 32 wherein said barcode reader is attached to said platform by an adjustable arm that can accommodate RFID containing stock of various widths.

40. The RFID encoding/verifying apparatus according to claim 37 wherein said OCR scanner is attached to said platform by an adjustable arm that can accommodate RFID containing stock of various widths.

41. The RFID encoding/verifying apparatus according to claim 32 wherein said barcode reader is for reading barcodes of various widths.

42. The RFID encoding/verifying apparatus according to claim 25 wherein the motor is a stepper motor and said RFID encoding/verifying apparatus further comprises a stepper motor driver in communication with said processor whereby said controller converts a digital signal received from said controller to a pulse signal and relays said pulse signal to said stepper motor driver so as to drive said stepper motor accordingly.

43. The RFID encoding/verifying apparatus according to claim 25 further comprising an optical sensor in communication with said motor, said optical sensor controlling the advancing of said motor according to data gathered by said optical sensor.

44. The RFID encoding/verifying apparatus according to claim 25 further comprising an optical sensor in communication with said processor, said processor sending RFID commands to read and/or write data from/to a tag embedded in a stock unit once a signal is sent from said optical sensor to said processor.

* * * * *

UNITED STATES PATENT AND TRADEMARK OFFICE
CERTIFICATE OF CORRECTION

| | | |
|---|---|---|
| PATENT NO. | : 7,073,712 B2 | Page 1 of 1 |
| APPLICATION NO. | : 10/635418 | |
| DATED | : July 11, 2006 | |
| INVENTOR(S) | : Keith Jusas, Brian Jusas and Todd Jusas | |

It is certified that error appears in the above-identified patent and that said Letters Patent is hereby corrected as shown below:

In claim 3, column 12, line 64 please replace "REID" with --RFID--; and

In claim 32, column 15, line 15 please replace "REID" with --RFID--.

Signed and Sealed this

Twelfth Day of December, 2006

JON W. DUDAS
*Director of the United States Patent and Trademark Office*